April 28, 1942.  J. C. SCHUMACHER ET AL  2,281,327
EXTRACTION OF BENZO-QUINONE
Filed June 5, 1940
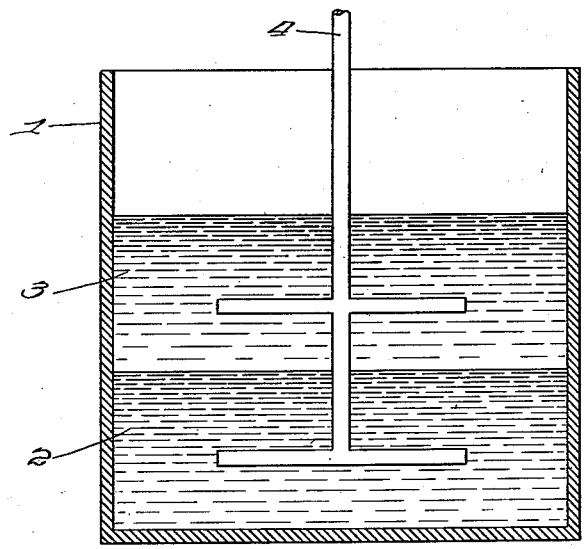
Inventors:
Joseph C. Schumacher
and Alwin C. Carus.
By Chritton, Wiles, Davies & Hirschl.
Attys.

Patented Apr. 28, 1942

2,281,327

UNITED STATES PATENT OFFICE 2,281,327

EXTRACTION OF BENZO-QUINONE

Joseph C. Schumacher and Alwin C. Carus, La Salle, Ill., assignors to Carus Chemical Company, Inc., a corporation of Illinois Application June 5, 1940, Serial No. 339,017

2 Claims. (Cl. 260—396)

This invention relates to a method of extracting benzo-quinone and more particularly to a method of extracting it from crude aqueous reaction mixtures containing it.

The usual method of preparing benzo-quinone is to oxidize aniline sulphate with manganese dioxide and sulphuric acid. Heretofore it has been necessary to remove the quinone formed by this reaction by steam or other distillation at temperatures below the decomposition temperature of the quinone. Extraction of the quinone from the reaction mixture by the use of organic solvents has not been economically practicable because of the fact that an emulsion is formed when the solvent is agitated with the quinone mixture. The yield obtainable by solvent extraction has, therefore, been quite low. As a result, impurities are carried over into the solvent and no commercially satisfactory yield has heretofore been obtainable by the solvent method.

It has now been discovered that quinone may be extracted in a satisfactorily pure form from reaction mixtures containing it by placing the aqueous reaction mixture in a shallow vessel, thus providing a large upper surface, and carefully applying thereon a supernatant layer of an organic solvent lighter than the aqueous reaction mixture. The upper layer may be of any suitable depth, and inasmuch as the specific gravity of the reaction mixture is approximately 1.3, all or nearly all organic solvents for quinone have a lower specific gravity.

Once the supernatant liquid has been established without disturbance of the interface, both the upper and the lower layers of liquid are slowly stirred in such a manner as not to create any turbulence at the interface while maintaining the two bodies of liquid in contact for a period sufficient to secure the desired degree of extraction. With normal commercial reaction mixtures and a solvent such as benzene or toluol, this will generally take from one to two days, depending upon temperature, concentration, and the relation of area to mass, as well as other factors.

The invention is illustrated diagrammatically in the drawing in which 1 represents a container in which the reaction mixture, obtained by reacting aniline sulfate with an oxidizing agent under acid conditions, is introduced after the formation of benzo-quinone; 2 represents a layer of the reaction mixture; 3 represents a layer of supernatant liquid; and 4 represents a stirrer which may be rotated slowly in any suitable manner.

As an example of the process, a quinone reaction mixture is produced by placing in a suitable still 80 parts of aniline, 410 parts of sulphuric acid, 220 parts of 85% manganese dioxide, and 560 parts of water, the ingredients being introduced under conditions to produce a temperature of 5–10° C. After the reaction has been completed, the organic solvent, preferably benzene, is permitted to flow slowly onto the top of the aqueous mixture, care being taken not to disturb the interface. It is preferred that the depth of the aqueous reaction mixture shall not appreciably exceed its diameter, and the shallower the depth, the quicker is the extraction. The depth of the layer of organic liquid is relatively unimportant because, if too little organic solvent is employed, it may be changed from time to time.

The material in each layer is stirred from time to time or preferably continuously by means of any suitable agitator which will not disturb the interface. Preferably a stirrer having horizontal arms rotating at a very slow rate may be utilized. For example, in a layer having a diameter of 2½ feet and a depth of from 1 foot to 2 feet may be suitably stirred by a horizontal stirrer rotating at the rate of 20 revolutions per minute. In the example just given, using a pool of liquid 2½ feet deep and 3 feet in diameter, and benzene as the solvent, a yield of approximately 80 parts of quinone was obtained after 48 hours' extraction.

The temperature of the liquids may be held at any point below decomposition temperature, but it is one of the advantages of the present process that the reaction mass does not have to be heated and, therefore, possible decomposition and side reactions are held at a minimum.

After the extraction of the quinone, the solution of it may be evaporated in any suitable manner to leave pure quinone which may be recrystallized as often as desired. On the other hand the solution may be utilized directly to produce hydroquinone or other quinone derivatives. It is preferred to carry out the manufacture of hydroquinone as disclosed in Schumacher Patent 2,006,324 by first forming quinhydrone, and the resulting quinhydrone is then reduced to hydroquinone by admixture with iron filings and a small amount to ferrous sulphate.

The foregoing detailed description has been given for clearness of understanding only, and no unnecessary limitations should be understood therefrom.

What is claimed as new, and desired to secure by Letters Patent, is:

1. The method of preparing benzo-quinone which comprises reacting aniline sulphate with manganese dioxide under acid conditions in the presence of an excess of water, and then supplying to the quiescent body of the resulting aqueous quinone-containing mixture a supernatant quiescent body of an organic solvent for the benzo-quinone lower in specific gravity than said mixture, and maintaining said organic solvent thereon for an extended period under circulating conditions sufficiently slow to produce no turbulence at the interface.

2. The method of preparing benzo-quinone which comprises oxidizing aniline sulfate under acid conditions in the presence of an excess of water, and then supplying to the quiescent body of the resulting aqueous quinone-containing mixture a supernatant quiescent body of an organic solvent for the benzo-quinone lower in specific gravity than said mixture, and maintaining said organic solvent thereon for an extended period under circulating conditions sufficiently slow to produce no turbulence at the interface.

JOSEPH C. SCHUMACHER.
ALWIN C. CARUS.